(12) United States Patent
Kuriki et al.

(10) Patent No.: US 9,148,538 B2
(45) Date of Patent: Sep. 29, 2015

(54) IMAGE SCANNING APPARATUS

(71) Applicant: Brother Kogyo Kabushiki Kaisha, Nagoya-shi, Aichi-ken (JP)

(72) Inventors: Yuichiro Kuriki, Nagoya (JP); Daisuke Nakayama, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/472,582

(22) Filed: Aug. 29, 2014

(65) Prior Publication Data

US 2015/0062672 A1    Mar. 5, 2015

(30) Foreign Application Priority Data

Aug. 30, 2013  (JP) ................................ 2013-178895

(51) Int. Cl.
*H04N 1/04*    (2006.01)
*H04N 1/00*    (2006.01)
*H04N 1/12*    (2006.01)
(Continued)

(52) U.S. Cl.
CPC ........... *H04N 1/00793* (2013.01); *B65H 5/068* (2013.01); *B65H 9/002* (2013.01); *H04N 1/0079* (2013.01); *H04N 1/00602* (2013.01); *H04N 1/00615* (2013.01); *H04N 1/00718* (2013.01); *H04N 1/12* (2013.01); *H04N 2201/0081* (2013.01)

(58) Field of Classification Search
CPC .......... H04N 1/00588; H04N 1/00602; H04N 1/00615; H04N 2201/0081; H04N 2201/0094; H04N 1/00278; H04N 1/00525; H04N 1/00535; H04N 1/00551; H04N 1/00591; H04N 1/00594; H04N 1/00618
See application file for complete search history.

(56) References Cited

U.S. PATENT DOCUMENTS

| 5,513,017 A | 4/1996 | Knodt et al. |
| 5,661,571 A | 8/1997 | Ijuin et al. |
| 5,680,651 A | 10/1997 | Tsuji et al. |

(Continued)

FOREIGN PATENT DOCUMENTS

| JP | H09-284478 A | 10/1997 |
| JP | 2005-051313 A | 2/2005 |

(Continued)

OTHER PUBLICATIONS

Apr. 16, 2014—(US) Non-Final Office Action—U.S. Appl. No. 14/040,457.

(Continued)

*Primary Examiner* — Negussie Worku
(74) *Attorney, Agent, or Firm* — Banner & Witcoff, Ltd.

(57) ABSTRACT

An image scanning apparatus is provided with a housing having a first inlet, a second inlet and an outlet, which are spaced from each other. A width of the first inlet is wider than that of the second inlet. A first guide is defined in the housing, connected to the first inlet and the outlet and has first and second guide surfaces opposing each other. A second guide is defined in the housing, connected to the second inlet and a confluence position, and has third guide and fourth guide surfaces opposing each other. The confluence position is defined in the second guide surface, the third guide surface is defined on the second guide surface side of the second inlet side with respect to the confluence position, a driven roller exposing from the third guide surface, and a scanning unit arranged between the confluence position and the outlet.

18 Claims, 10 Drawing Sheets

(51) Int. Cl.
*B65H 5/06* (2006.01)
*B65H 9/00* (2006.01)

(56) References Cited

U.S. PATENT DOCUMENTS

| | | | |
|---|---|---|---|
| 5,710,634 A * | 1/1998 | Kuriyama et al. | 358/296 |
| 5,751,446 A * | 5/1998 | Fujioka | 358/474 |
| 6,088,135 A | 7/2000 | Kusumoto | |
| 6,178,017 B1 * | 1/2001 | Ishida | 358/498 |
| 6,665,098 B1 | 12/2003 | Nagarajan | |
| 7,561,313 B2 | 7/2009 | Endo | |
| 7,872,783 B2 | 1/2011 | Kitagawa et al. | |
| 7,913,994 B2 | 3/2011 | Morikawa et al. | |
| 7,954,803 B2 | 6/2011 | Kitagawa et al. | |
| 8,210,515 B2 * | 7/2012 | Nishizawa et al. | 271/3.14 |
| 8,333,377 B2 | 12/2012 | Kohyama | |
| 8,371,573 B2 | 2/2013 | Morikawa et al. | |
| 8,608,152 B2 * | 12/2013 | Takahata | 271/3.14 |
| 8,675,264 B2 | 3/2014 | Olsen | |
| 8,705,150 B2 | 4/2014 | Shirai et al. | |
| 8,717,636 B2 * | 5/2014 | Lee et al. | 358/461 |
| 2002/0176115 A1 | 11/2002 | Yamamoto | |
| 2003/0197770 A1 | 10/2003 | Klinefelter et al. | |
| 2005/0057785 A1 | 3/2005 | Endo | |
| 2008/0259414 A1 | 10/2008 | Kitagawa et al. | |
| 2008/0285097 A1 | 11/2008 | Kitagawa et al. | |
| 2009/0189337 A1 | 7/2009 | Yamamoto | |
| 2011/0101602 A1 | 5/2011 | Kohyama | |
| 2012/0105925 A1 | 5/2012 | Shirai et al. | |
| 2013/0170001 A1 | 7/2013 | Takahata et al. | |
| 2014/0103598 A1 | 4/2014 | Kuriki | |
| 2014/0138902 A1 * | 5/2014 | Takahata et al. | 271/109 |
| 2014/0239583 A1 * | 8/2014 | Kawashima | 271/265.01 |

FOREIGN PATENT DOCUMENTS

| | | |
|---|---|---|
| JP | 2008-270954 A | 11/2008 |
| JP | 2008-285259 A | 11/2008 |
| JP | 2011-066676 A | 3/2011 |
| JP | 2012-015677 A | 1/2012 |
| JP | 2012-034186 A | 2/2012 |
| JP | 2012-065064 A | 3/2012 |
| JP | 2012-100115 A | 5/2012 |
| JP | 2012-171788 A | 9/2012 |
| JP | 2012-171789 A | 9/2012 |
| JP | 2012-184057 A | 9/2012 |
| JP | 2012-216930 A | 11/2012 |
| JP | 2012-216931 A | 11/2012 |

OTHER PUBLICATIONS

Machine translation of JP 9-284478, retrieved Apr. 5, 2012.
Aug. 7, 2014—(US) Notice of Allowance—U.S. Appl. No. 14/040,457.
Mar. 14, 2014—(US) Co-pending U.S. Appl. No. 14/210,563.
Sep. 23, 2014—(US) Ex Parte Quayle Office Action—U.S. Appl. No. 14/210,563.
Mar. 11, 2015—(US) Non-Final Office Action—U.S. Appl. No. 14/210,563.
Jul. 6, 2015—(EP) Office Action—App 14182809.5.

* cited by examiner

IMAGE SCANNING APPARATUS

CROSS-REFERENCE TO RELATED APPLICATION

This application claims priority under 35 U.S.C. §119 from Japanese Patent Applications No. 2013-178895 filed on Aug. 30, 2013. The entire subject matter of the application is incorporated herein by reference.

BACKGROUND

1. Technical Field

The present disclosure relates to an image scanning apparatus configured such that a skew phenomenon, or oblique proceeding of a sheet conveyed therein is suppressed.

2. Conventional Art

Conventionally, there has been known an image scanning apparatus which is configured such that oblique proceeding of a sheet conveyed inside the apparatus is prevented or suppressed. Such a conventional scanning apparatus generally has, for example, a housing, a first guide part, a second guide part, a scanning unit and a sheet conveying unit. For example, the housing has a first inlet opening, a second inlet opening and an outlet. The second inlet opening is located next to the first inlet opening in a width direction thereof, a width of the second inlet opening being smaller than that of the first inlet opening. The outlet communicates with the first and second inlet openings. The first guide part is provided to the housing. The first guide part connects the first inlet opening with the outlet, and has a curved part. The second guide part is also provided to the housing. The second guide part linearly connects the second inlet opening with a confluence position which is located in the vicinity of the curved part of the first guide part. The scanning unit is provided inside the housing. The conveying unit is provided inside the housing.

The second guide part has a second guide surface. The second guide surface extends from the second inlet opening to the confluence position, and configured to contact a medium (e.g., a card) introduced from the second inlet opening from below. The first guide part has a first lower guide surface and a first upper guide surface. The first lower guide surface is connected to the second guide surface at the confluence position. The first lower guide surface located on the downstream with respect to the confluence position extends in a direction substantially similar to a direction where the second guide surface extends, and is configured to contact the medium passing the confluence position from below. The first upper guide surface faces the first lower guide surface. The conveying unit has a first conveying part. The first conveying part has a driving roller and the driven roller. The driving roller is provided on the first lower guide surface side at the first guide part, and inside a path extending from the second inlet opening to the outlet in the width direction. The driving roller is configured to rotate about a driving shaft (rotation shaft) which is located on the outlet side with respect to the confluence position. The driven roller is arranged on the first upper surface side at the first guide part. The driven roller is rotatably supported about a driven shaft (another rotation shaft) which is located above the driving axis of the driving roller, or above a plane extending in a direction from the confluence position to the outlet (i.e., in a sheet conveying direction). The driven roller inside a path extending from the second inlet opening to the outlet in the width direction is spaced from the driving roller by a predetermined amount.

In such a conventional image scanning apparatus, the conveying unit conveys the medium guided by the first guide part and the second guide part to the outlet. The scanning unit scans an image formed on the medium which has passed the confluence position. At this stage, the first conveying unit conveys the medium introduced from the second inlet opening to the outlet via the confluence position. On the other hand, the first conveying unit is configured such that the driven axis of the driven roller is located above the driving axis of the driving roller, and the driven roller is spaced from the driving roller by the predetermined amount, thereby a relatively wide medium introduced from the first inlet opening is not sandwiched by the driving roller and the driven roller.

SUMMARY

According to aspects of the disclosure, there is provided an image scanning apparatus provided with a housing having a first inlet, a second inlet and an outlet, the second inlet being arranged on one end portion and in a width direction of the first inlet, a length in the width direction of the second inlet being smaller than a length of the first inlet in the width direction, the outlet communicating with the first inlet and the second inlet, a first guide portion provided in the housing to connect the first inlet with the outlet, the first guide portion having a bent portion, a second guide portion defined in the housing to connect the second inlet with a confluence position of the first guide part defined at a position in the vicinity of the curved portion, and a scanning unit arranged in the housing and at a position on the outlet side with respect to the confluence position. The first guide portion has a first lower guide surface and a first upper guide surface, and the second guide portion has a second guide surface, and the second guide surface extends from the second inlet to the confluence position. Further, the first lower guide surface is connected to the second guide surface at the confluence position and extends from the confluence portion toward the outlet in a direction where the second guide surface extends, and the first upper guide surface faces the first lower guide surface. The image scanning apparatus is further provided with a second driven roller arranged at a position opposite to the second guide surface in the second guide portion, the second driven roller being rotatable about a second driven axis and facing the second guide surface.

According to aspects of the disclosure, there is provided an image scanning apparatus which is provided with a housing having a first inlet, a second inlet and an outlet, a width of the first inlet being wider than a width of the second inlet, the first inlet, the second inlet and the outlet being apart from each other, a first guide defined in the housing, connected to the first inlet and the outlet and having a first guide surface and a second guide surface opposing each other, a second guide defined in the housing, connected to the second inlet and a confluence position and having a third guide surface and a fourth guide surface opposing each other, the confluence position being defined in the second guide surface, the third guide surface is defined the second guide surface side of the second inlet side with respect to the confluence position, a driven roller exposing from the third guide surface, and a scanning unit arranged between the confluence position and the outlet.

According to further aspects of the disclosure, an image scanning apparatus is provided with a first housing having a first surface, a second housing arranged below the first housing, the second housing having a second surface facing and spaced apart from the first surface, the second housing having a third surface and a fourth surface facing and spaced apart from the third surface, the fourth surface being arranged below the third surface, the third and fourth surfaces connected to the second surface at a confluence position, a length of the third surface in a width direction and a length of the third surface in the width direction being smaller than a length of the first surface in the width direction, a driven roller supported rotatably by the second housing, an outer circumferential surface of the driven roller protruding from the third surface, the driven roller being movable with respect to the third surface an axis of the driven roller extending in the width direction, and a scanning unit arranged at a specific position, the specific position being a position on a least one of the first surface and the second surface, the specific position being opposite to the driven roller with respect to the confluence position.

Accordingly, the image scanning apparatus according to aspects of the disclosure can well suppress oblique proceeding of the medium introduced from the first inlet opening.

BRIEF DESCRIPTION OF THE
ACCOMPANYING DRAWINGS

Figure 12:
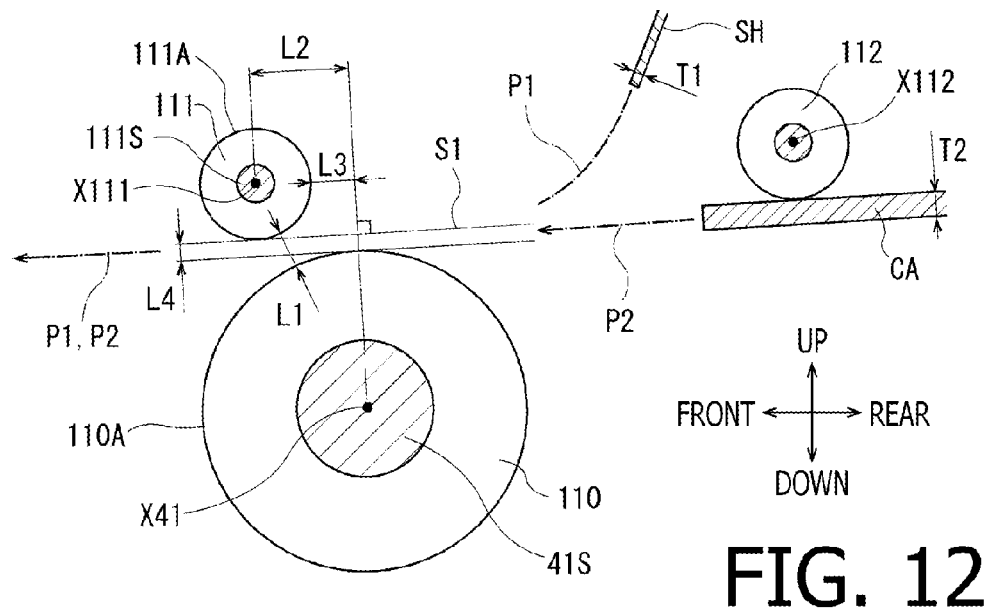

FIG. 12 schematically shows a positional relationship among the card driving roller, the first driven roller and the second driven roller of the image scanning apparatus according to the illustrative embodiment.

DETAILED DESCRIPTION OF THE
ILLUSTRATIVE EMBODIMENT

Hereinafter, an illustrative embodiment according to the present invention will be described referring to the accompanying drawings.

It is noted that, in the conventional image scanning apparatus configured as mentioned above, if the wide medium introduced from the first inlet opening is curled, an end part in the width direction of the medium may easily contact the driven roller of which the driven axis is arranged above the driving axis of the driving roller. When an end, in the width direction, of the medium contacts the driven roller, the medium receives a reactive force, which works in a direction opposite to the sheet conveying direction, from the driven roller. Therefore, a part of the medium corresponding to the position where the first conveying unit is provided is less easy to be conveyed than the other portion of the medium. As a result, the medium may be conveyed obliquely (i.e., a skew may occur).

Further, in the conventional image scanning apparatus, if the curled end part contacts the driven roller, the medium may curved in the width direction as the medium is conveyed. If the curved part contacts the driving roller, the medium receives a force from the driving roller although the medium is not sandwiched by the driving roller and driven roller. As a result, also in this case, the medium may be conveyed obliquely.

According to aspects of the present disclosure, there is provided an improved image scanning apparatus 1 in which the skew (i.e., the oblique proceeding) of the medium which is introduced from the first inlet opening can be suppressed.

In the following description, directions of the image scanning apparatus 1 will be defined as follows. A side where an outlet 13 is formed is defined as a front side of the image scanning apparatus 1. A left-hand side when the image scanning apparatus 1 is viewed from the outlet 13 side is defined as a left side of the image scanning apparatus 1. A right side of the image scanning apparatus will be defined similarly. Up and down sides of the image scanning apparatus 1 coincide with up and down directions of FIG. 1. The above directions with respect to the image scanning apparatus 1 will be indicated in the other drawings where necessary or appropriate and referred to in the following description.

Overall Configuration

The image scanning apparatus 1 has a housing 30 and a tray 36. The housing 30 includes a first housing 31 and a second housing 32 as shown in FIGS. 1-6.

The first housing 31 is arranged above the second housing 32. The first housing 31 and the second housing 32 face each other with a predetermined clearance therebetween in the up-and-down direction. The second housing 32 has a first wall part 33R and a second wall part 33L. The first wall part 33R forms a right-side surface of the second housing 32. The second wall part 33L forms a left-side surface of the second housing 32. The first wall part 33R and the second wall part 33L extend upward and sandwich the first housing 31 from outside of the first housing 31, in the right-and-left direction.

The first housing 31 has an upper surface 31A, a front surface 31B and an upper guide surface 31G as shown in FIGS. 1 and 5-7.

The upper surface 31A is planar surface facing upward. The upper surface 31A is inclined downward from the rear side of the first housing 31 to the front side of the first housing 31. At a central part of the upper surface 31A, a touch panel 70 is provided. The front surface 31B is a planar surface facing frontward. The front surface 31B is connected to the front end of the upper surface 31A, and extends vertically and downwardly therefrom. The upper guide surface 31G is a curved surface facing downward. The upper guide surface 31G is inclined downward at a position below the rear end of the upper surface 31A toward the front side. The upper guide surface 31G extends horizontally (e.g., frontward) from a position substantially center, in the front-and-rear direction, of the first housing 1 to the lower end 31BA of the front surface 31B.

The second housing 32 has a front surface 32B, a lower guide surface 32G and a rear surface 32C as shown in FIGS. 1, 2 and 5-8.

The front surface 32B is a front-pointing planar surface. The upper end 32BA of the front surface 32B is arranged below the lower end of the front surface 31B with a certain space therebetween. The front surface 32B extends downward and vertically. The lower guide surface 32G is an planar surface facing upward. The lower guide surface 32G extends from a position above an upper end of the rear surface 32C and is inclined downward toward the front side, substantially along the upper guide surface 31G. The lower guide surface 32G extends horizontal (e.g., frontward) at a position substantially center, in the front-and-rear direction, of the second housing 32 to the upper end 32BA of the front surface 32B. The rear surface 32C is a rearward-pointing planar surface. The rear surface 32C extends downward and substantially vertically.

The second housing 32 has a lower card guide surface 32J and an upper card guide surface 32H as shown in FIGS. 2 and 6-8.

The lower card guide surface 32J is connected to the right end part of the horizontally extending part of the lower guide surface 32G, extends rearward and horizontally to the rear surface 32C. The upper card guide surface 32H is arranged above the lower card guide surface 32J with a certain space therebetween. The upper card guide surface 32H is arranged in parallel with the lower card guide surface 32J, and extends rearward and horizontally to the rear surface 32C. The position of the upper card guide surface 32H in the up-and-rear direction is substantially the same as the position of the horizontal part of the upper guide surface 31G.

It is noted that each of the upper guide surface 31G, the upper card guide surface 32H and the lower card guide surface 32J should not be limited to a planar and smooth surface. For example, each of the upper guide surface 31G, the upper card guide surface 32H and the lower card guide surface 32J may be defined by an upper ends of a plurality of ribs or the like.

In the following description, a position where the lower card guide surface 32J is connected to the right end part of the horizontal part of the lower guide surface 32G will be referred to as a confluence position J1.

A first inlet 11 and the outlet 13 are defined on the housing 30. In the first inlet opening 11, the sheet SH is to be inserted. The sheet SH is, for example, a printing sheet or an OHP (overhead projector) sheet. Examples of a relatively wide sheet are ones of a letter size, A4 size, and the like. An example of a relatively narrow sheet SH is a postcard. A name card, a message card and the like, which has a narrow width may be regarded as the sheet SH if they are sufficiently thin and flexible (bendable) so that they are conveyed with being guided between the curved surfaces of the upper guide surface 31G and the lower guide surface 32G.

Figure 1:
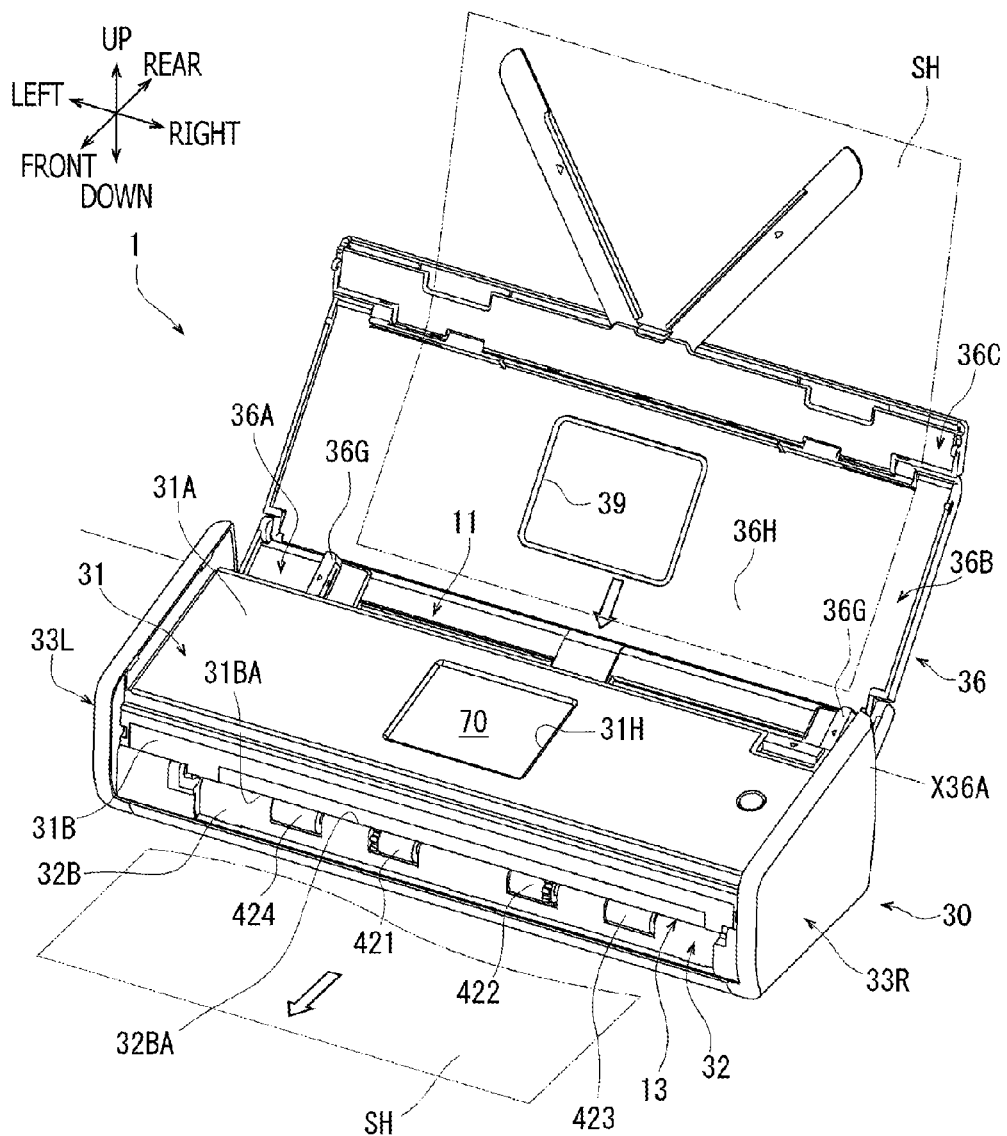
FIG. 1 is a perspective view showing mainly a front portion of an image scanning apparatus according to illustrative embodiment of the invention, when a tray is located at an open position.
Figure 5:
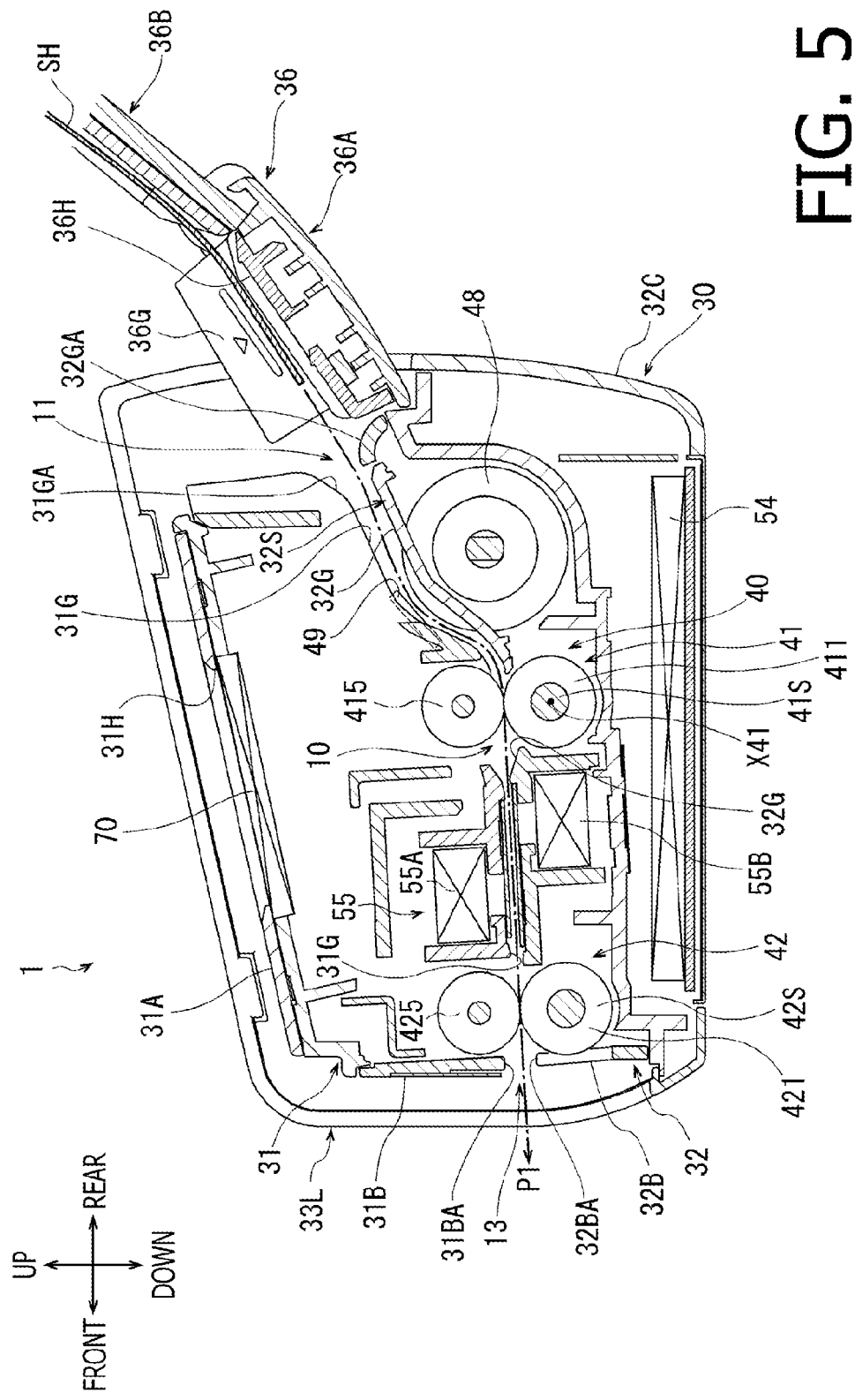
FIG. 5 is a cross-sectional view, taken along a line A-A of FIG. 4, of the image scanning apparatus according to the illustrative embodiment.

For example, the first inlet 11 is defined between the first housing 31 and the second housing 32 as shown in FIG. 5. The first inlet 11 is a clearance between the rear end 31GA of the upper guide surface 31G and the rear end 32GA of the lower guide surface 32G. As shown in FIG. 1, the first inlet 11 extends in the right-and-left direction, from a position in the vicinity of the first side wall part 33R to a position in the vicinity of the second side wall part 33L. The length of the first inlet 11 in the right-and-left direction is set to be longer than the width of any usable sheet SH.

According to the illustrative embodiment, the width direction of the first inlet 11 is the right-and-left direction.

The sheet SH is discharged from the outlet 13. The outlet 13 is defined between the first housing 31 and the second housing 32. For example, the outlet 13 is a clearance between the lower end 31BA of the front surface 31B and the upper end 32BA of the front surface 32B. The outlet 31 extends in the right-and-left direction, from a position in the vicinity of the first side wall part 33R to a position in the vicinity of the second side wall part 33L. Similar to the first inlet opening 11, the length of the outlet 13 in the right-and-left direction is set to be longer than that of any one of the usable sheets SH.

Figure 4:
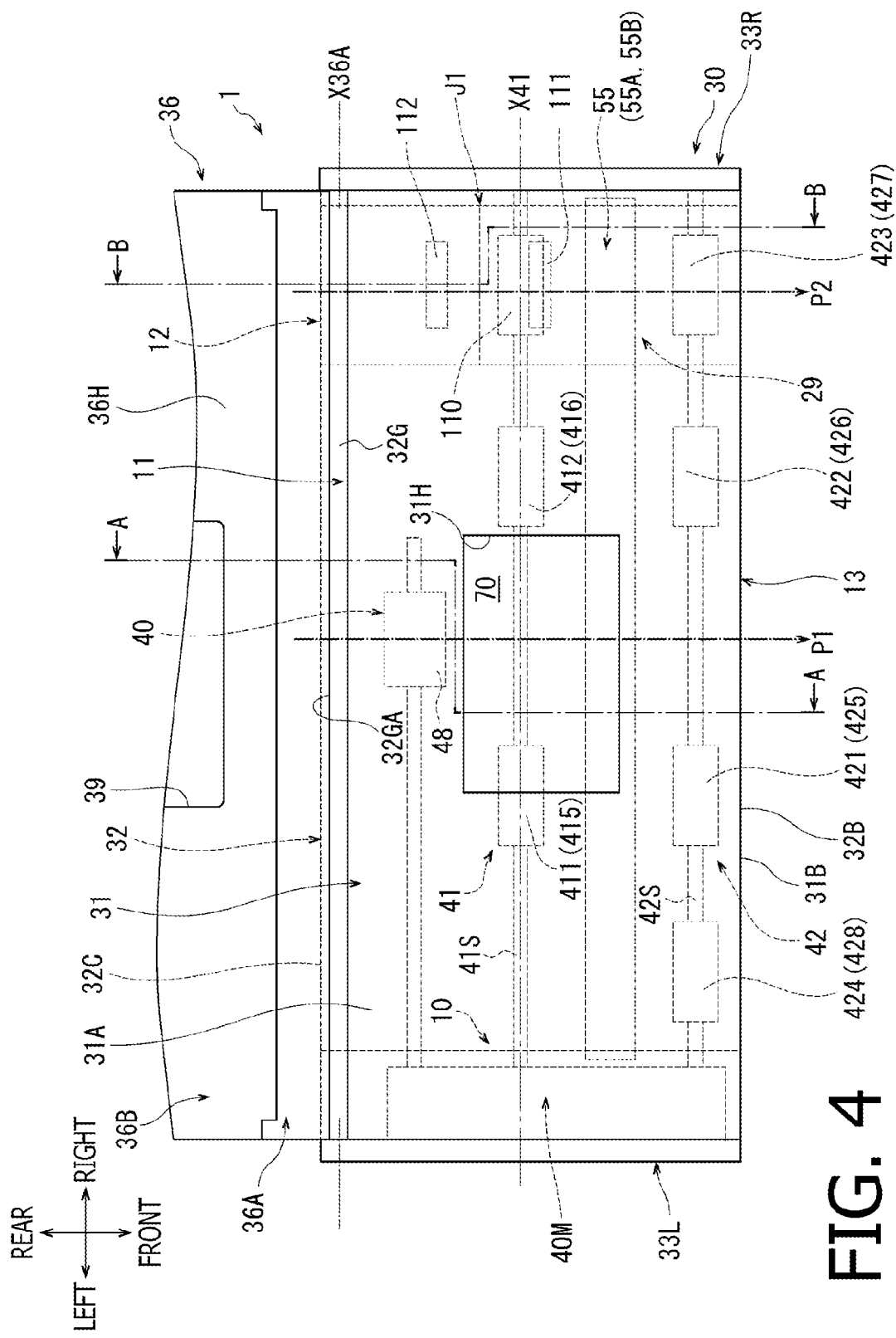
FIG. 4 is a plan view schematically showing the image scanning apparatus according to the illustrative embodiment when the tray is located at the open position.
Figure 6:
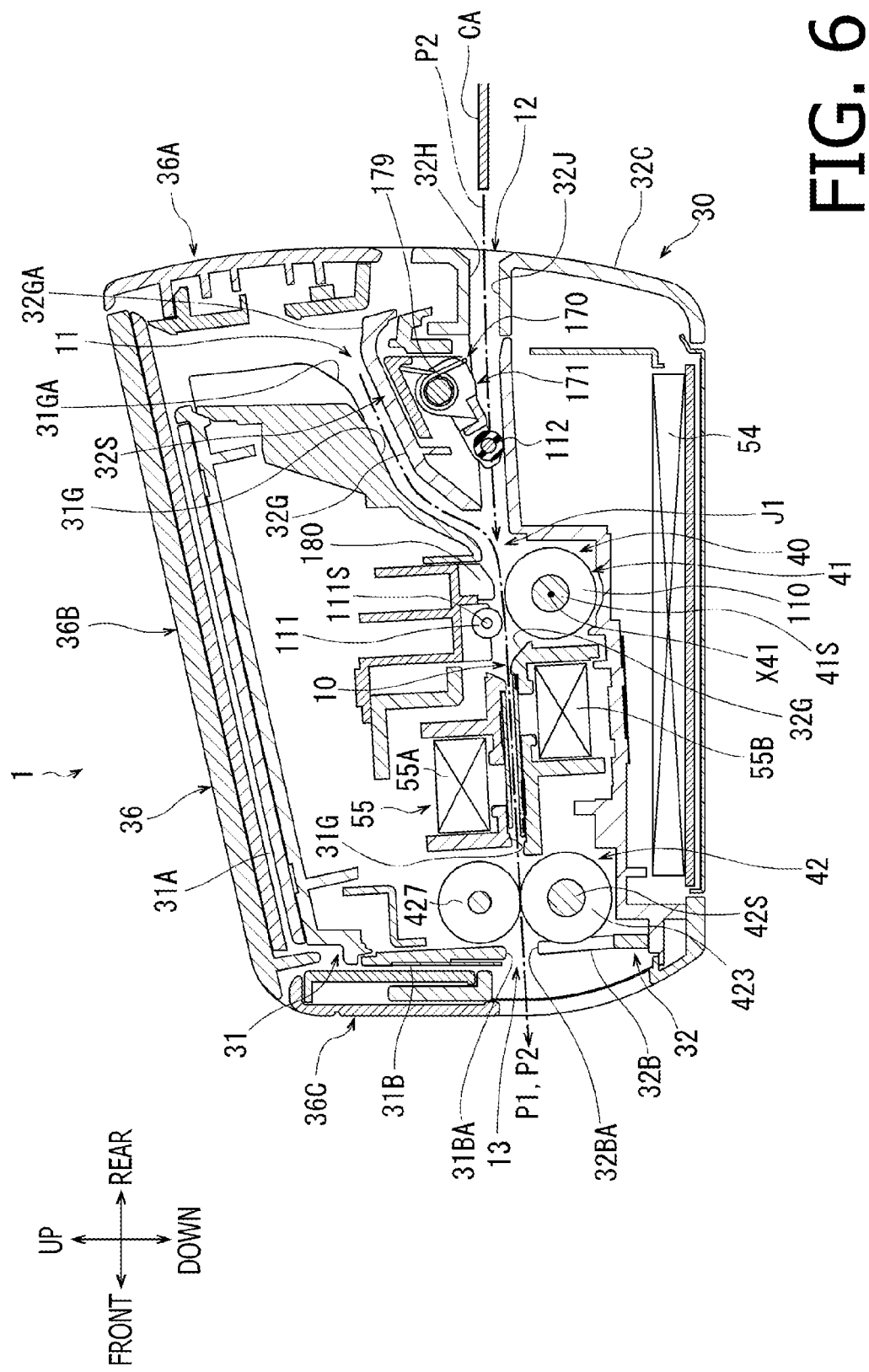
FIG. 6 is a cross-sectional view, taken along a line B-B in FIG. 4, of the image scanning apparatus according to the illustrative embodiment when the tray is located at the closed position.

The image scanning apparatus 1 has a first guide part 10 as shown in FIGS. 4-6. The first guide part 10 has the lower guide surface 32G and the upper guide surface 31G. The first guide part 10 defines a first conveying path P1 as shown in FIGS. 4-6. The first guide part 10 guides the sheet SH from the first inlet 11 to the outlet, along the first conveying path P1.

The first guide part 10 is inclined downward from the first inlet 11 to the front side. The first guide part 10 has a bent portion at substantially central portion in the front-and-rear direction of the housing 30. The first guide part 10 changes the extending direction to a horizontal direction at the bent portion, and extends horizontally from the bent portion to the outlet 13.

Figure 7:
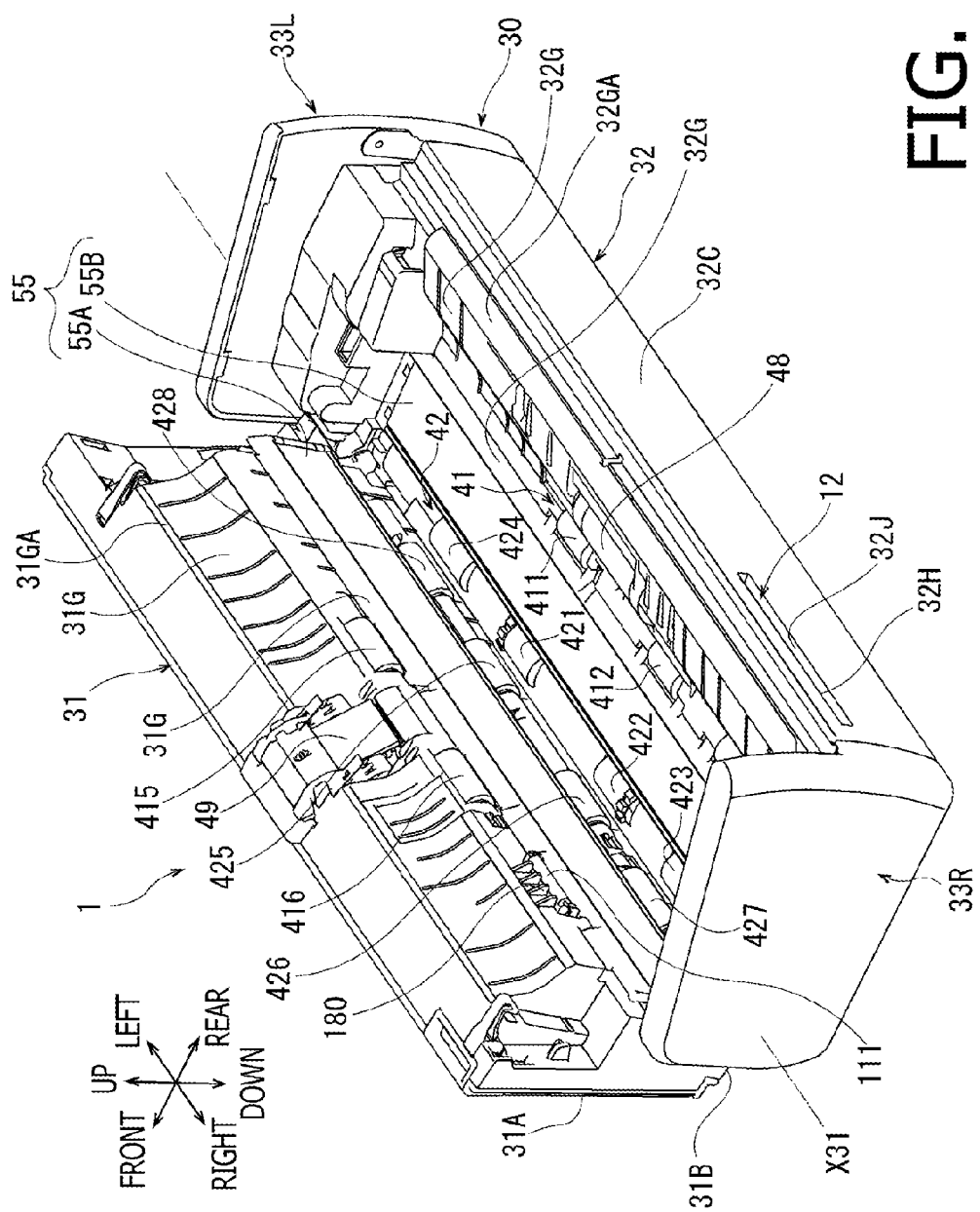
FIG. 7 is a partial perspective view of the image scanning apparatus according to the illustrative embodiment, when the first housing is opened.

The second housing 32 supports the first housing 31 pivotally about an open/close axis (rotation axis) X31 to open/close the upper side of the second housing 32 as shown in FIG. 7. The open/close axis X31 is located at a position close to the lower end 31BA of the front surface 31B of the first housing 31, that is, a position in the vicinity of the outlet 13, and extends in the right-and-left direction. As the first housing 31 moves upward with respect to the second housing 32, that is, rotates about the open/close axis X31 to expose the first guide part 10 to outside.

A second inlet opening 12 is formed to the housing 30 as shown in FIGS. 2, 4, 6 and 7. In the second inlet opening 12, a narrow card CA is to be inserted. The card CA is a small sheet. Examples of the card CA is a name card, a cash card, a membership card, a driver's license and the like.

For example, the second inlet opening 12 is formed as a through hole formed on the rear surface 32C of the second housing 32. The second inlet opening 12 is formed at a central part in the up-and-down direction on the rear surface 32C, and on the first side wall part 33R side. The second inlet opening 12 extends in the right-and-left direction. The length, in the right-and-left direction, of the second inlet 12 is smaller than the length, in the right-and-left direction, of the first inlet 11. Further, the length, in the right-and-left direction, of the second inlet 12 is set to be longer than the width of the card CA. A position of the second inlet 12 in the up-and-down direction is substantially the same as the position of the horizontal part and outlet 13 of the first guide part 10 in the up-and-down direction. The second inlet opening 12 overlaps the right end portion of the first inlet 11 when viewed in the up-and-down direction.

Figure 3:
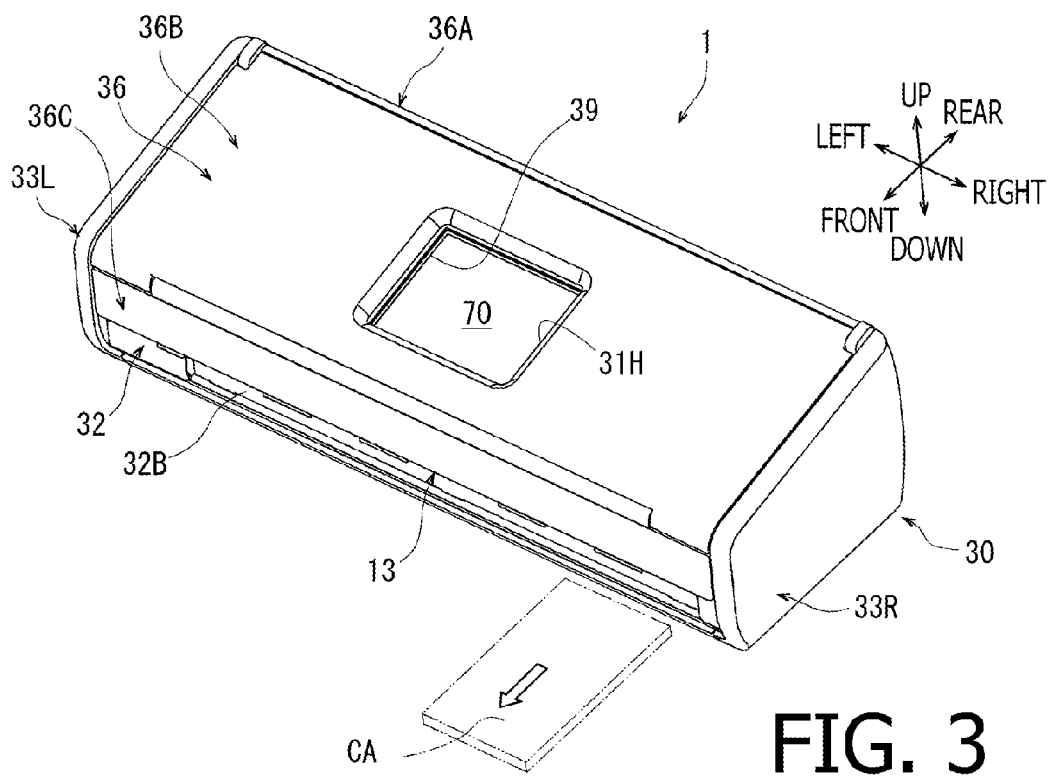
FIG. 3 is a perspective view showing mainly the front portion of the image scanning apparatus according to the illustrative embodiment, when the tray is located at the closed position.

The card CA is discharged through the right end part of the outlet 13 as shown in FIGS. 3 and 6. Thus, from the outlet 13, both the sheet SH introduced through the first inlet 11 and the card CA introduced through the second inlet 12 are discharged.

The image scanning apparatus 1 has a second guide part 20 as shown in FIGS. 4 and 6. The second guide part 20 has the upper card guide surface 32H and the lower card guide surface 32J. The second guide part 20 is confluent with the first guide part 10 at the confluence position J1.

The confluence position J1 where the second guide part 20 is confluent with the first guide part 10 is set to be a position in the vicinity of the bent part of the first guide part 10. The confluence position J1 is defined at a bent position where the upper guide surface 31G and the extending direction of the lower guide surface 32G is changed from the downwardly inclined direction, from the rear side toward the front side, to the horizontally extending direction.

An area which is a right end portion of the first guide part 10, has a width the same as the width, in the right-and-left direction, of the second guide part 20, extends from the confluence position J1 to the outlet 13 will be defined as a card conveying area 29 as shown in FIG. 4. The second guide part 20 and the card conveying area 29 define a second conveying path P2 as shown in FIGS. 4 and 6. The second conveying path P2 horizontally extends from the second inlet 12 (rear side) to the right end part of the outlet 13.

The second guide part 20 guides the card CA inserted from the second inlet opening 12 to the confluence position J1 of the first guide part 10 such that the card CA is conveyed along the second conveying path P2 and is confluent with the first guide part 10 at the confluence position J1. In this case, the lower card guide surface 32J can contact the card CA introduced from the second inlet opening from the below. Further, the card conveying area 29 of the first guide part 10 is configured such that the card CA is guided to the right end side of the outlet 13 along the second conveying path P2. In this case, the lower guide surface 32G can contact the card CA passing the confluence position J1 from the below.

The tray 36 has a proximal part 36A, an intermediate part 36B and a distal part 36C. The proximal part 36A is supported by the first side wall part 33R and the second side wall part 33L so as to be rotatable about an open/close axis (rotation axis) X36A which extends in the right-and-left direction. The intermediate part 36B is connected to the proximal part 36A at an end side farther from the open/close axis X36A. The distal part 36C is connected to the intermediate part 36B at the end side farther from the proximal part 36A. At a central part of the intermediate part 36B, an operation opening 39 having a rectangular shape is formed.

When the tray 36 is located at an open position as shown in FIGS. 1, 4 and 5, the proximal part 36A, the intermediate part 36B and the distal part 36C are upwardly inclined toward the rear side, and the first inlet 11 is opened. In this state, surfaces of the proximal part 36A, the intermediate part 36B and the distal part 36C, which face upward, form a holding surface 36H. When a user place one or more sheets in the tray 36, the holding surface 36H hold (support) the sheets from the below.

Figure 2:
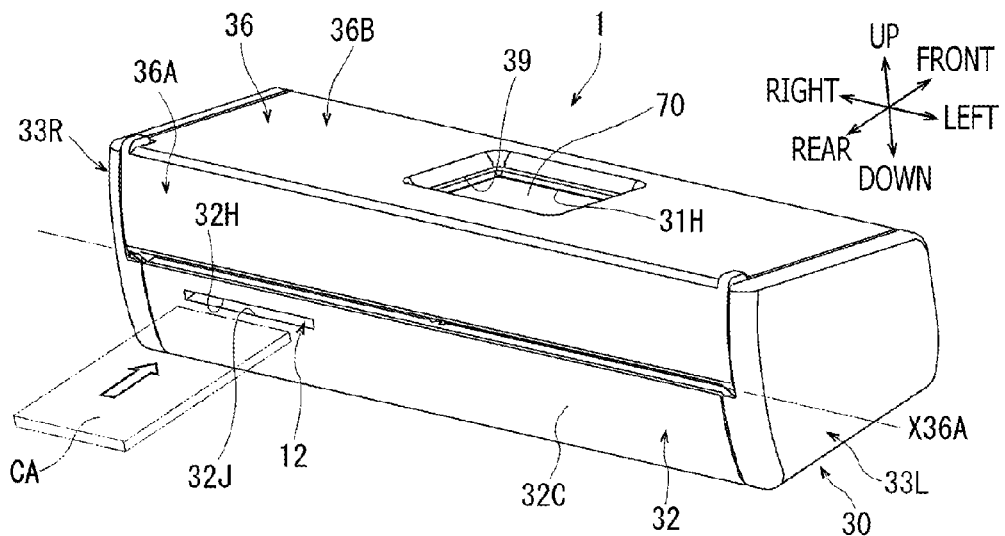
FIG. 2 is a perspective view showing mainly a rear portion of the image scanning apparatus according to the illustrative embodiment, when the tray is located at a closed position.

When the tray 36 is located at a close position as shown in FIGS. 2, 3 and 6, the proximal part 36A is oriented substantially vertically and form a single surface with the rear surface 32 of the second housing 32. Further, the intermediate part 36B covers the upper surface 31A of the first housing 31 from the above. Further, the distal part 36C covers the front surface 31B of the first housing 31 from the front side. In this state, the operation opening 39 exposes the touch panel 70 to outside.

Figure 8:
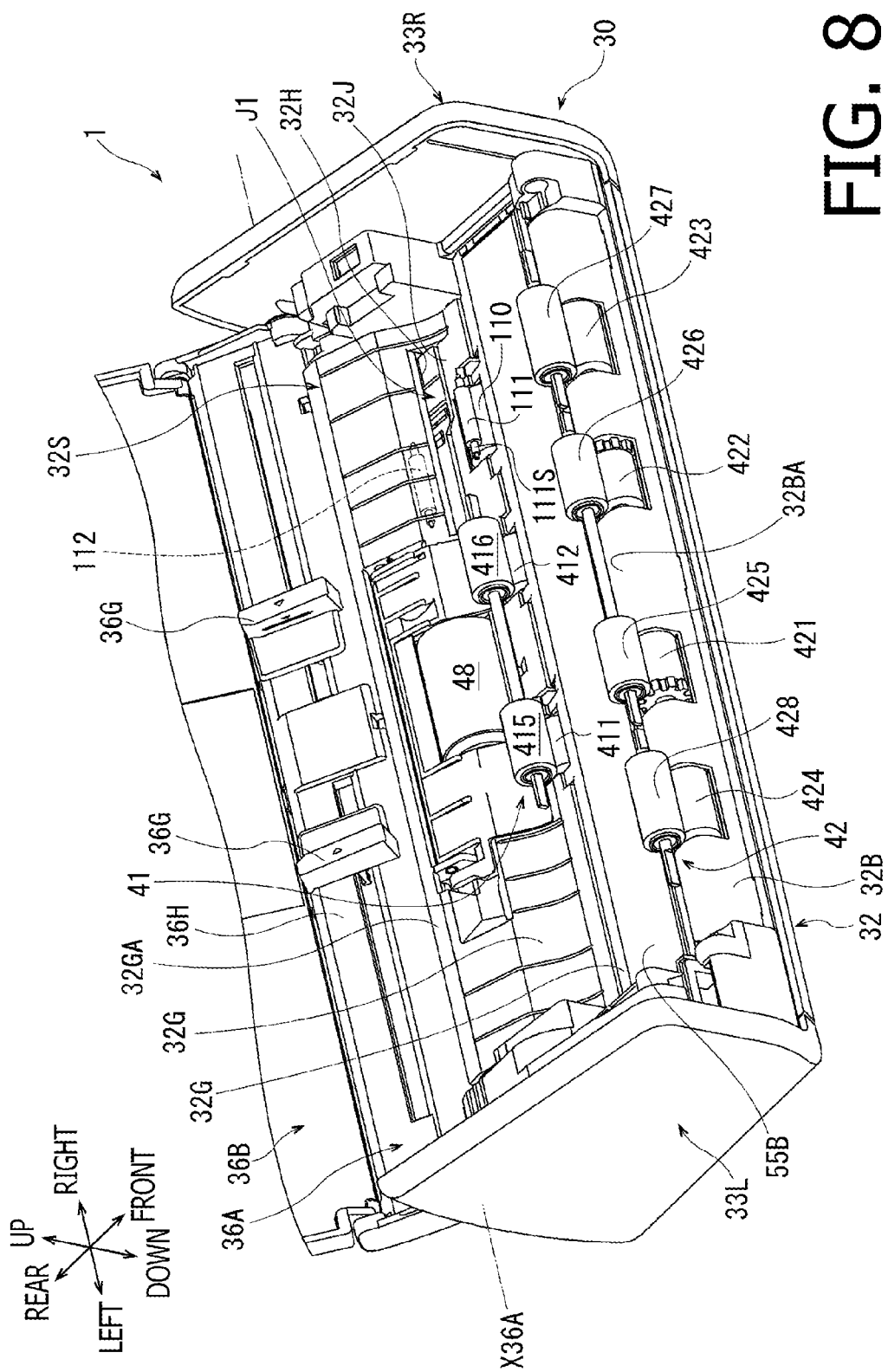
FIG. 8 is a partial perspective view of the image scanning apparatus according to the illustrative embodiment, when the first housing is removed with remaining a first driven roller and other components.

The image scanning apparatus 1 has right and left regulation parts 36G as shown in FIGS. 1, 5 and 8. Each regulation part 36G slidably provided to the proximal part 36A, and protruded above the holding surface 36H. Each regulation part 36G is connected to a rack and pinion mechanism (not shown) provided inside the proximal part 36A. Each regulation part 36G sandwich the sheet SH which is held by the holding surface 36H and is to be introduced in the first inlet 11 from the right and left sides, thereby adjust the positions of the sheet SH in the right-and-left direction. In association with the above positioning, each regulation part 36G is moved by the rack and pinion mechanism. thereby the position of the sheet SH is adjusted with respect to the center thereof. FIG. 1 shows a case where the right and left regulation parts 36G are most separated in the right-and-left direction. In this stage, the regulation parts 36G position the sheet SH of a letter size such that the center of the sheet in the width direction coincides with a center of the first inlet opening in the right-and-left direction.

The image scanning apparatus 1 has a circuit board 54, a drive source 40M, a conveying unit 40 and a scanning unit 55 as shown in FIGS. 4-6.

The circuit board 54 is arranged at a bottom part of the second housing 32. The circuit board 54 has a CPU (central processing unit), a ROM (read only memory), a RAM (random access memory) and the like. To the circuit board 54, an electrical power is supplied from a household wall socket via an AC adaptor and feeder lines. The circuit board 54 is electrically connected to the drive source 40M, the scanning unit 55, the touch panel 70 and the like, and controls the same with appropriately supplying the electrical power.

The drive source 40M is arranged on the second side wall 33L side inside the second housing 32. The drive source 40M has a motor and a transmission gear train (not shown). The driver source 40M generates a driving force as controlled by the circuit board 54.

The conveying unit 40 has a separation roller 48, a separation pad 49, an upstream conveying part 41, and a downstream conveying part 41. The scanning unit 55 has a first scanning unit 55A and a second scanning part 55B. These are arranged, in the first guide part 10, in this order from the rear side to the front side (i.e., from the upstream to the downstream in the sheet conveying direction).

The separation roller 48 is rotatably supported inside the second housing 32 as shown in FIGS. 4, 5, 7 and 8. The upper part of the separation roller 48 is exposed through an opening formed on the inclined part of the lower guide surface 32G toward the first guide part 10. The separation roller 48 is arranged at a central part, in the right-and-left direction, at the first guide part 10.

The separation roller 48 is driven by the drive source 40M to rotate as the circuit board 54 controls the drive source 40M. The separation roller 48 contacts the sheet SH held on the hold surface 36H of the tray 36 and rotates, thereby the sheet SH being fed toward the first guide part 10.

The separation pad 49 is provided to the first housing 31 as shown in FIGS. 5 and 7. The separation pad 49 is exposed to the first guide part 10 through an opening formed on the upper guide surface 31G. The separation pad 49 is a plate-like member made of frictional material such as rubber, elastomeric material and the like. The separation pad 49 is urged by an urged member (not shown) toward the separation roller 48. With this configuration, the separation roller 48 and the separation pad 49 sandwich the sheet SH guided by the first guide part 10, thereby the sheet SH being separated and conveyed one by one.

The upstream conveying unit 41 has upstream driving rollers 411 and 412, a card-directed driving roller 110, upstream driven rollers 415 and 416, a first drive roller 111, a second driven roller 112 and an urging mechanism 170.

The upstream driving rollers 411 and 412, and the card-directed driving roller 110 are arranged on the lower guide surface 32G side in the first guide part 10 that is, provided to the second housing 32 at positions between the confluence position J1 and the second scanning unit 55B. The upstream driving rollers 411 and 412, and the card-directed driving roller 110 are fixed to an upstream driving shaft 41S. The upstream driving shaft 41S extends in the right-and-left direction, from the drive source 40M to the vicinity of the right first side wall part 33R. The upstream driving shaft 41S has a driving axis (rotation axis) X41 which is located between the confluence position J1 and the second scanning unit 55B and extends in the right-and-left direction.

The card-directed driving roller 110 is arranged at a right end part of the first guide portion 10, and inside the second conveying path P2. The upstream driving rollers 411 and 412 are arranged on the center side, in the right-and-left direction, with respect to the card-directed driving roller 110 and outside the second conveying path P2. The upstream driving roller 411 is arranged on the left side with respect to the separation roller 48. The upstream driving rollers 411 and 412, and the card-directed driving roller 110 rotate about the driving axis X41 as the driving force of the drive source 40M is transmitted through the upstream driving shaft 41S.

Upstream driven rollers 415 and 416 are arranged on the upper guide surface 31G side of the first guide part 10, that is, provided to the first housing 31 as shown in FIGS. 5 and 8. The upstream driven rollers 415 and 416 are located immediately above the upstream driving rollers 411 and 412, respectively, above a plane along which the sheet SH is conveyed, and respectively face the upstream driving rollers 411 and 412. The upstream driven rollers 415 and 416 are urged by a spring (not shown) toward the upstream driving rollers 411 and 412, respectively. The sheet SH guided by the first guide part 10 is sandwiched by the upstream driving rollers 411, 412 and upstream driven rollers 415, 416, which transmit the driving force to the sheet SH.

Figure 9:
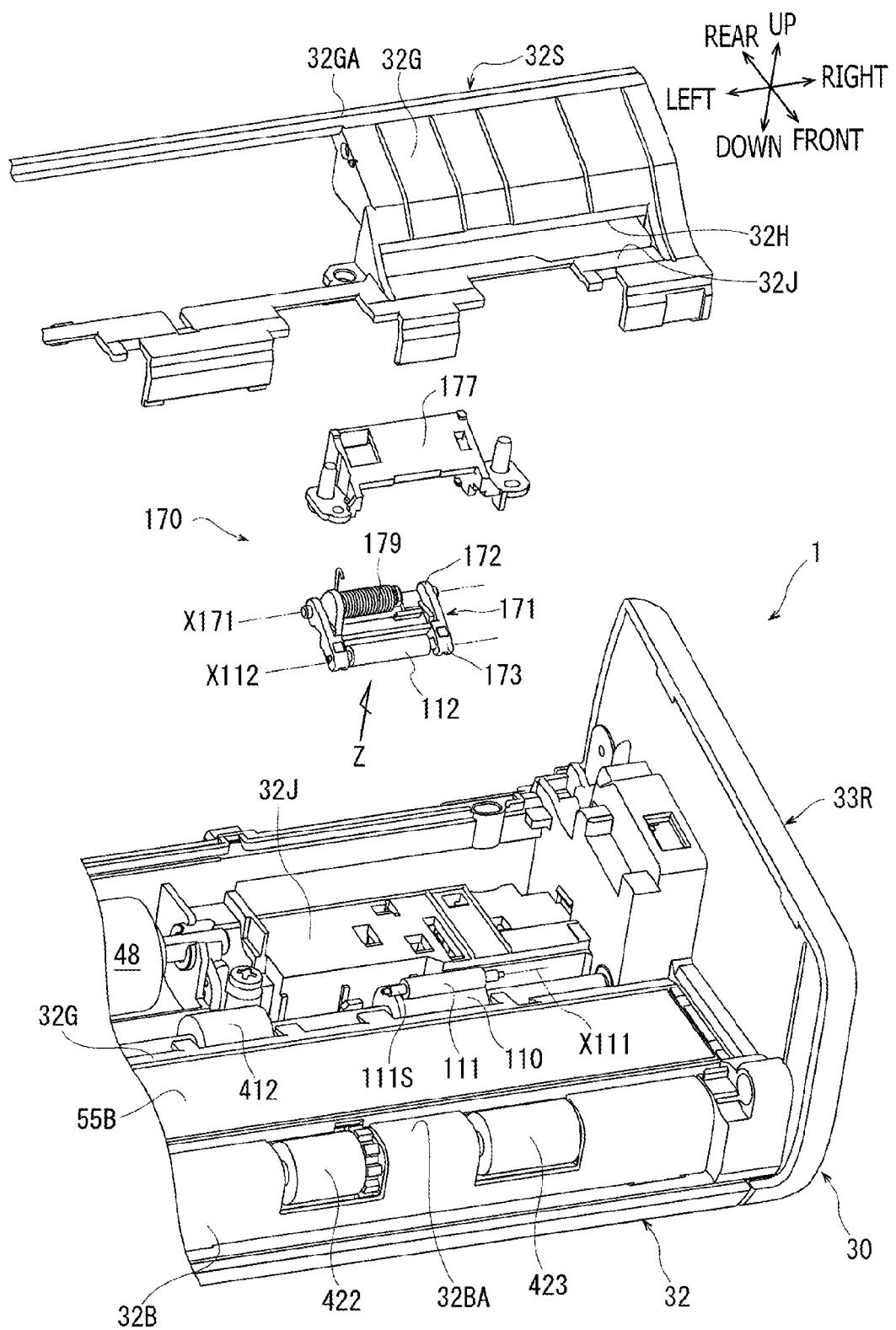
FIG. 9 is an exploded partial perspective view mainly showing a card driving roller, the first driven roller, a second driven roller and an urging mechanism of the image scanning apparatus according to the illustrative embodiment.

The first driven roller 111 is arranged on the upper guide surface 31G side of the first guide part 10, that is provided to the first housing 31 as shown in FIGS. 6-9 and 11. The first driven roller 111 has a smaller diameter than each of the upstream driven rollers 415 and 416. A first driven shaft 111S penetrates both (i.e., right and left) side surfaces of the first driven roller 111 and protruded therefrom as shown in FIGS. 8 and 9. The first driven shaft 111S is supported by the first housing 31 rotatably about the first driven axis (rotation axis) X111 which extends in the right-and-left direction. The first driven shaft 111S is fixed with respect to the first guide part 10.

Between the circumferential surface 110A of the card-directed driving roller 110 and the circumferential surface 111A of the first driven roller 111, a clearance with a first distance L1 is provided. The first driven axis X111 is shifted frontward with respect to the driving axis X41 by a second distance L2. That is, the first driven roller 111 is rotatably supported by the first housing 31 such that the first driven roller 111 is rotatable about the driven axis X111 which is arranged closer to the outlet 13 side than the driving axis X41, and spaced from the card-directed driving roller 110 by the first distance L1.

The entire circumferential surface 111A of the first driven roller 111 is arranged on the front side with respect to the driving axis X41 by the distance L3, that is, arranged closer to the outlet 13 with respect to the driving axis X41.

The first distance L1 is set to be larger than a thickness T1 of a wide sheet SH. A part of the wide sheet SH passes through the second path P2. With this configuration, the card-directed driving roller 110 and the first driven roller 111 do not sandwich such a sheet SH.

A tangent line S1 contacts the lower part of the circumferential surface 111A of the first driven roller 111 and extends in a direction parallel to the lower card guide surface 32J and lower guide surface 32G. The tangent line S1 is spaced upward from the circumferential surface 110A of the card-directed driving roller 110 by a fourth distance L4. The fourth distance L4 is set to be smaller than a thickness T2 of the card CA conveyed in the second conveying path P2. With this configuration, the card-directed driving roller 110 and the first driving roller 111 sandwich the card CA to transmit the conveying force to the card CA. It may be advantageous if the fourth distance L4 is larger than a thickness T1 of a wide sheet SH. With such a configuration, it is ensured that the card-directed driving roller 110 and the first driven roller 111 do not hold the sheet SH.

Figure 11:
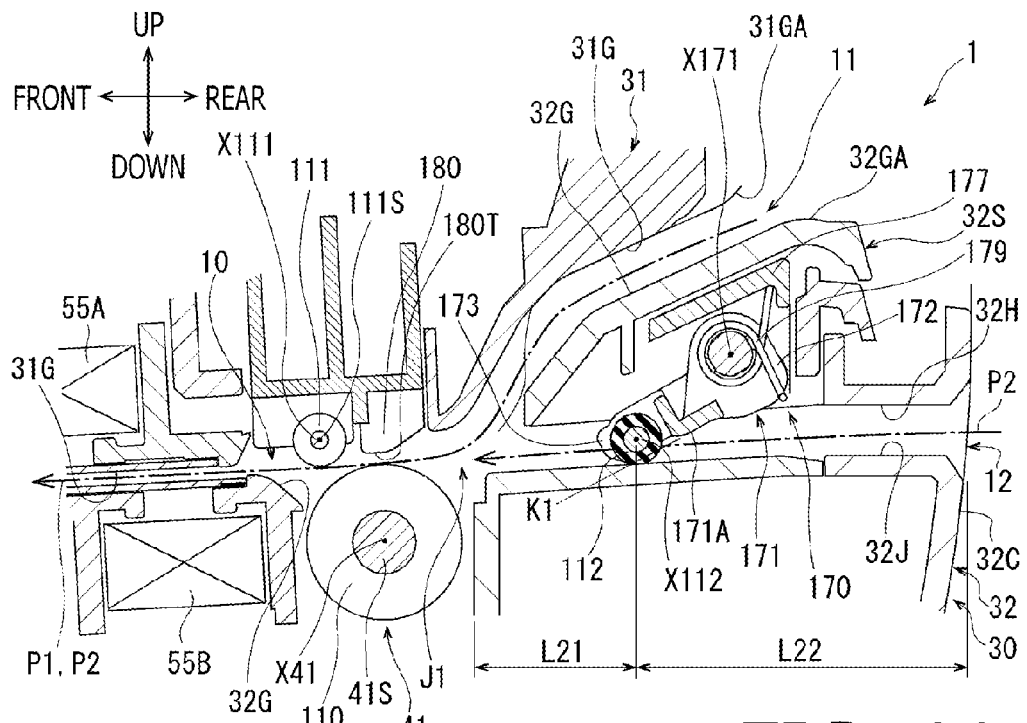
FIG. 11 is a partially enlarged cross-sectional view of FIG. 6.

On the upper guide surface 31G side with respect to the first guide part 10, a plurality of ribs 180 are formed as shown in FIGS. 7 and 11. For example, the ribs 180 are arranged at a position on the rear side with respect to the first driven roller 111 (i.e., on the confluence position J1 side with respect to the first driven roller 111), and aligned along the right-and-left direction. Each of the ribs 180 protrude toward the lower guide surface 32G as shown in FIG. 11. An end of each rib 180 oriented downward is downwardly inclined toward the front side. A front end 180T of each rib 180 is closer to the lower guide surface 32G than the first driven axis X111.

Figure 10:
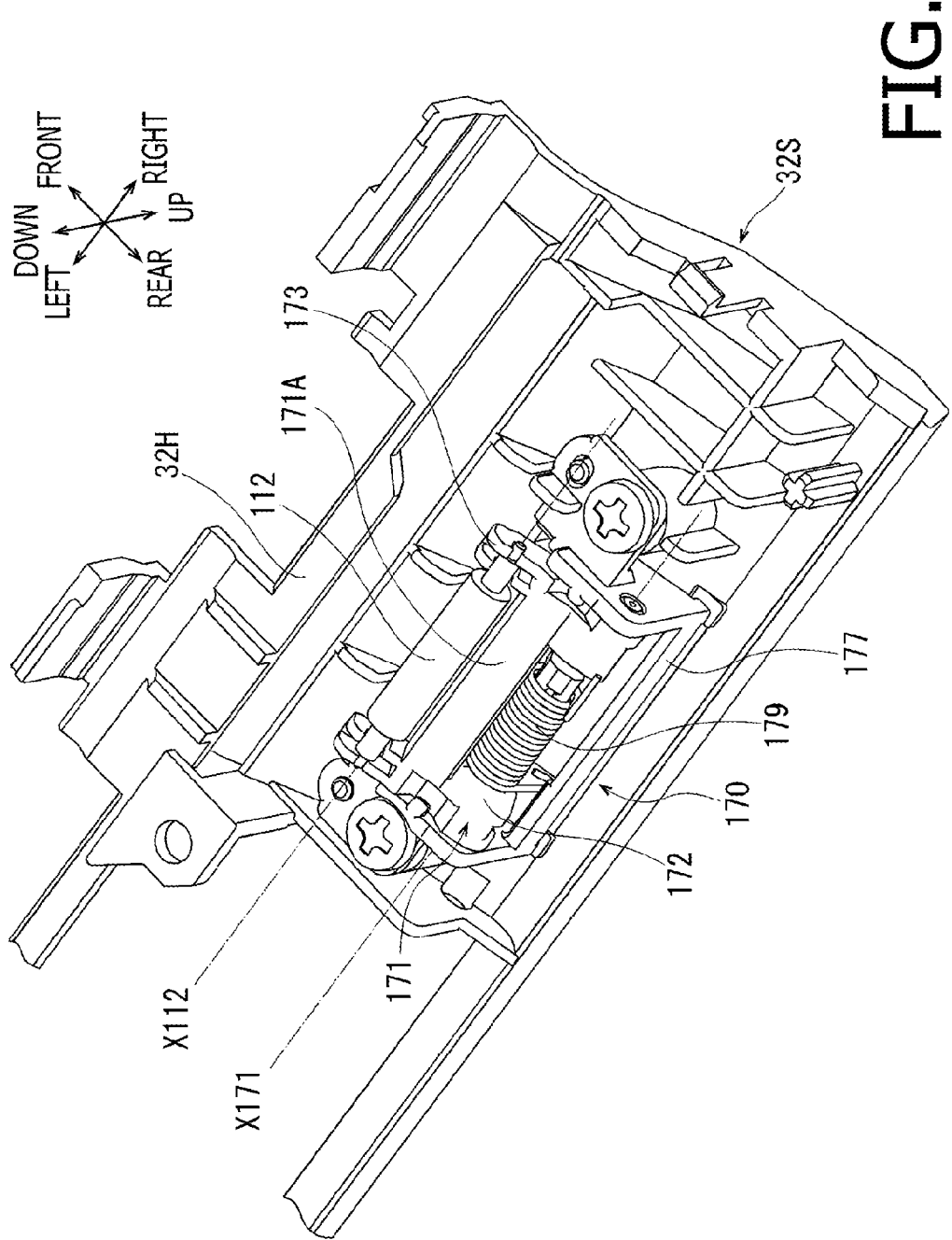
FIG. 10 is a partial perspective view of the image scanning apparatus according to the illustrative embodiment viewed from an arrow Z in FIG. 9.

The second driven roller 112 and the urging mechanism 170 are arranged on a side opposite to the lower card guide part 32J of the second guide part 20, that is, arranged on the upper card guide surface 32H side as shown in FIGS. 6, 8-11. For example, the second housing 32 has a lower chute member 32S. A surface, which faces upward, of the lower chute member 32 constitutes an inclined part of the lower guide surface 32G as shown in FIGS. 10 and 11. The upper card guide surface 32H is formed by lower ends of a plurality of downwardly protruded ribs and downward-pointing planar surface, and the second driven roller 112 and the urging mechanism 170 are accommodated in spaced formed among the ribs.

The urging mechanism 170 has an attaching member 177, an arm 171 and a torsion coil spring 179 as shown in FIGS. 9-11.

The attaching member 177 is secured to the lower chute member 32S with a screw. The attaching member 177 is formed with the lower chute member 32S with integral molding.

The arm 171 has a supported part 172 and a roller supporting part 173. The supported part 172 is supported by the attaching member 177 rotatably about a rotation axis X171 which extends in the right-and-left direction. The roller supporting part 173 is arranged at a position spaced from the supported part 172 in downward and frontward direction, that is, at a position closer to the confluence position J1 than the supported part 172. The roller supporting part 173 is configured to support the second driven roller 112 rotatably about a second driven axis X112 extending in the right-and-left direction.

The second driven roller 112 faces the lower card guide surface 32J as shown in FIG. 11. A distance L21 between the second driven roller 112 and the confluence position J1 is smaller than a distance L22 between the second driven roller 112 to the second inlet opening 12. The second driven roller 112 is arranged at a position in the vicinity to the confluence position J1.

The torsion coil spring 179 urges the arm 171. For example, the torsion coil spring 179 applies torque rightward, i.e., in a closer direction with respect to a plane of FIG. 11, to the arm 171. The torque acts such that the second driven roller 112 approaches, about the rotation axis X171, the lower card guide surface 32J. Urged by thus configured urging mechanism 170, the second driven roller 112 contacts the lower card guide surface 32J.

The arm 171 has a facing surface 171A as shown in FIGS. 10 and 11. The facing surface 171A faces the lower card guide surface 32J and inclines such that a portion of the arm 171 closer to the confluence position J1 is closer to the lower card guide surface 32J. Given a virtual plate K1 which is an extension of the facing surface 171A toward the confluence position J1, the second driven axis X112 of the second driven roller is arranged on a side opposite to the lower card guide surface 32J with the virtual plane K1 therebetween.

The second scanning unit 55B is assembled to the second housing 32. Specifically, the second scanning unit 55B has a CIS (contact image sensor), a CIS holder, a contact glass and the like. The upper surface of the second scanning unit 55B is exposed to the first guide part 10 at a portion corresponding to the horizontal part of the lower guide surface 32G.

The first scanning unit 55A is assembled to the first housing 31. The first scanning unit 55A also has a CIS, a CIS holder, a contact glass and the like. The lower surface of the first scanning unit 55A is exposed to the first guide part 10 at a position corresponding to the horizontal part of the upper guide surface 31G.

The first scanning unit 55A and the second scanning unit 55B extend, in the right-and-left direction, from a portion in the vicinity of the right first side wall part 33R to a portion in the vicinity of the left second side wall part 33L as shown in FIG. 4. The first scanning unit 55A and the second scanning unit 55B face each other with the first guide part 10 included the card conveying area 29 sandwiched, in the up-and-down direction, therebetween as shown in FIGS. 4-6.

With the above configuration, the first scanning unit 55A and the second scanning unit 55B scan images on both sides of the sheet SH when the sheet SH is conveyed along the first guide part 10. Further, when the card CA which is guided by the second guide part 20 and reached the first guide part 10 is further conveyed in the card conveying area 29, the first scanning unit 55A and the second scanning unit 55B scan images on both sides of the card CA.

The downstream side conveying part includes downstream driving rollers 421, 422, 423 and 424, and downstream driven rollers 425, 426, 427 and 428 as shown in FIGS. 4-8.

The downstream driving rollers 421, 422, 423 and 424 are arranged on the lower guide surface 32G side of the first guide part 10, that is, provided to the second housing 32 at positions between the first scanning unit 55A and the outlet 13. The downstream driving rollers 421, 422, 423 and 424 are fixed to the downstream driving shaft 42S. The downstream driving shaft 42S extends from the drive source 40M to the position in the vicinity of the right first side wall part 33R, in the right-and-left direction. The downstream driving roller 423 is located on the right side end of the first guide part 10 and inside the second conveying path P2. The downstream driving rollers 421 and 422 are located at a center side positions with respect to the roller 423, in the right-and-left direction, and outside the second conveying path P2. The downstream driving roller 424 is located on the left side end of the first guide part 10, at the left side portions with respect to the first guide part 10, and on the left side with respect to the downstream driving roller 421. The downstream driving rollers 421, 422, 423 and 424 are driven to rotate as the driving force of the drive source 40M is transmitted through the downstream driving shaft 42S.

The downstream driven rollers 425, 426, 427 and 428 are arranged on the upper guide surface 31G side of the first guide part 10, that is, provided to the first housing 31. The downstream driven rollers 425, 426, 427 and 428 are arranged immediately above the downstream driving rollers 421, 422, 423 and 424, respectively, and face the same. The downstream driven rollers 425, 426, 427 and 428 are urged by urging springs (not shown) toward the downside driving rollers 421, 422, 423 and 424, respectively. The sheet SH guided by the first guide part 10 is sandwiched between the downstream driving rollers 421-424 and the downstream driven rollers 425-428, and thereby, the driving force is transmitted to the sheet SH.

The touch panel (touch screen) 70 is arranged on the upper surface 31A side inside the first housing 31 as shown in FIGS. 1 and 5. The touch panel 70 is exposed to outside through a touch panel opening 31H, which is a rectangular through opening formed on the upper surface 31A. The touch panel 70 includes an LCD (liquid crystal display) panel, a light source such as a fluorescent lamp or LED (light emitting diode) illuminate the LCD panel from behind, and a touch sensor layer adhered on the surface of the LCD panel.

The touch panel 70 is controlled by the circuit board 54 to display operation status of the image scanning apparatus 1 such as processing status, error status and the like. Further, the touch panel 70 acquires external operations. Specifically, the touch panel 70 displays operation buttons such as one starting an image scanning, one for inputting operational settings and the like. When the user touches the touch panel 70 at the portions corresponding to the displayed buttons, the touch panel 70 acquires the user operations and transmits the same to the circuit board 54.

Sheet and Card Scanning Operation

In the image scanning apparatus 1 according to the illustrative embodiment, the images on the sheet SH and the card CA are scanned as follows.

When an image on the sheet SH is to be scanned, the user moves the tray 36 to the open position as shown in FIGS. 1 and 5. If the tray 36 is already located at the open position, the open state is retained. Then, the sheet SH is placed on the tray 36 by the user. The circuit board 54 determines whether a user instruction to start scanning is input through the touch panel 70. When it is determined that the user instruction to start scanning is input, the circuit board 54 starts a scanning operation of the image formed on the sheet SH after confirming that the sheet SH is held on the holding surface 36H of the tray 36 with use of a sheet detection sensor (not shown).

When the scanning operation is started, the circuit board 54 controls the drive source 40M to generate a driving force. Then, the separation roller 48 rotates with the sheet SH being nipped between the separation roller 48 and the separation pad 49. The separation roller 48 introduces the sheet SH on the tray 36 through the first inlet 11 and sends the sheet SH to the first guide part 10. At this stage, even if a plurality of sheets SH tend to be conveyed by the sheet separation roller 48, one sheet SH is separated from the other by friction between the separation pad 49 and the sheet SH, and is introduced in the first guide part 10.

The sheet SH introduce by the separation roller 48 is conveyed in the first guide part 10 with the upstream driving rollers 411 and 412, and the upstream driven rollers 415 and 416 of the upstream conveying unit 41. It is noted that the first driven roller 111 is spaced from the card-directed driving roller 110 by the first distance L1. Therefore, the right end portion of the sheet SH is not held by the card-directed driving roller 110 and the first driven roller 111. Thus, the driving force is not transmitted to the sheet SH from the card-directed driving roller 110 and the first driven roller 111.

The images formed on both sides of the sheet SH which is conveyed in the first guide part 10 are scanned by the first scanning unit 55A and the second scanning unit 55, respectively. The sheet SH of which images have been scanned is further conveyed by the downstream driving rollers 421-424 and downstream driven rollers 425-428 of the downstream conveying unit 42, and discharged to outside the housing 30 through the outlet 13.

When the images on the card CA are to be scanned, the tray 36 is located at the close position by the user as shown in FIGS. 2, 3 and 6. When the ray 36 is already in the close position, the position is retained. Then, the card CA is inserted, by the user, in the second inlet 12 from the rear side of the housing 30 as shown in FIG. 2. Then, the card CA passes through the second guide part 20 and the leading end of the card CA reaches the card conveying area 29. At this stage, the second driven roller 112 urged by the urging mechanism 170 contacts the upper surface of the card CA and rotates, thereby the card CA is press-contacted to the lower card guide surface 32J. The circuit board 54 judges whether the start of scanning of the card CA is instructed through the touch panel 70, and starts the scanning operation in response to the user instruction and after confirming the card CA has been inserted through the second inlet opening 12 with user of a card detection sensor (not shown).

Then, the circuit board 54 controls the drive source 40M to generate the driving force. When the driving force is generated, the card-directed driving roller 110, the first driven roller 111 and the second driven roller 112 of the upstream conveying unit 41 conveys the card CA inside the second conveying path P2 so that the card CA is directed to the right end portion of the outlet 13 via the confluence position J1. The images on both sides of the card CA are scanned by the first scanning unit 55A and the second scanning unit 55B. The card CA of which images have been scanned are discharged outside through the right end part of the outlet 13 as conveyed by the downstream driving roller 423 and the downstream driven roller 427 of the downstream conveying unit 42 as shown in FIG. 3.

In the image forming apparatus 1 according to the illustrative embodiment, in addition to a structure of arranging the first driven roller 111 spaced from the card-directed driving roller 110 by the first distance L1, the first driven axis X111 faces the card-directed driving roller 110 at a position closer to the outlet 13 with respect to the driving axis X41 of the card-directed driving roller 110 as shown in FIGS. 11 and 12. In particular, according to the illustrative embodiment, the entire circumferential surface 111A of the first driven roller 111 is located on the outlet 13 side with respect to the driving axis X41. With this configuration, even if the sheet SH, which is introduced from the first inlet opening 11 and is relatively wide so that the right side portion thereof passes inside the second path P2, is curled, the right end portion of the sheet SH hardly contacts the first driven roller 111 in comparison with a conventional image scanning apparatus. Thus, according to the illustrative embodiment, it is possible to suppress that a resistant force against the conveying force is applied to the right end portion of such a curled sheet SH. Further, the second driven roller 112 is arranged on the upper card guide surface 32H side of the second guide part 20. Therefore, the second driven roller 112 does not contact the sheet SH introduced from the first inlet opening 11. Therefore, according to the illustrative embodiment, a skew (i.e., an oblique proceed) of the sheet SH introduced from the first inlet opening 11 can be suppressed.

According to the illustrative embodiment, the distance L21 between the second driven roller 112 and the confluence position J1 is smaller than the distance L22 between the second driven roller 112 and the second inlet opening 12 as shown in FIG. 11. Further, the second driven roller 112 is arranged in the vicinity of the confluence position J1. With this structure, according to the illustrative embodiment, the second driven roller 112 is close to the card-directed driving roller 110, an area, in the sheet conveying direction, where both the card-directed driving roller 110 and the second driven roller 112 contact the card CA can be elongated. As a result, the driving force from the card-directed driving roller 110 can be well transmitted to the card CA introduced from the second inlet opening 12.

Further, according to the illustrative embodiment, since the second driven roller 112 is urged by the urging mechanism 170 such that the card CA introduced from the second inlet opening 12 is well contacted with the lower card guide surface 32J, the driving force of the card-directed driving roller 110 can be well transmitted.

Furthermore, according to the illustrative embodiment, with a relatively simple structure employing the arm 171 formed with the supported part 172 and roller supporting part 173, and the torsion coil spring 170 applying urging force to the arm 171, the urging mechanism 170 can be made compact.

Still further, according to the illustrative embodiment, since the torsion coil spring 179 is arranged to have the same rotation axis X171 as the supported part 172, further downsizing of the urging mechanism 170 is possible.

Further, according to the illustrative embodiment, the surface 171A of the arm 171 inclines and face the lower card guide surface 32J such that the portion closer to the confluence position J1 of the surface 171A is closer to the lower card guide surface 32J, the card CA introduced from the second inlet 12 can be guided to approach the lower card guide surface 32J by the surface 171A.

Further, according to the illustrative embodiment, the second driven axis X112 is arranged on a side opposite to the lower card guide surface 32J with the virtual plane K1 located therebetween. Therefore, by the surface 171A which is an origin of the virtual plane K1, the card CA introduced from the second inlet opening 12 can be guided without being caught on the second driven roller 112.

Still further, according to the illustrative embodiment, the second driven roller 112 is urged by the urging mechanism 170 to contact the lower card guide surface 32J. Therefore, the card CA introduced from the second inlet opening 12 is urged by the second driven roller 112, and guided without floating from the lower card guide surface 32J.

According to the illustrative embodiment, the tip ends 180T of the ribs 180, which are arranged on the confluence position J1 side with respect to the first driven roller 111, are closer to the lower guide surface 32G than the first driven axis X111. With this configuration, the sheet SH introduced from the first inlet opening 11 and the card CA introduced from the second inlet opening 12 can be guided by the ribs 180, without being caught on the second driven roller 112.

It is noted that the present invention should not be limited to the configuration of the illustrative embodiment described above. That is, the invention can be modified in various ways without departing from the scope of the invention.

What is claimed is:

1. An image scanning apparatus, comprising:
a housing having a first inlet extending in a width direction, a second inlet and an outlet, the second inlet being arranged on one end portion of the housing in the width direction, a length in the width direction of the second inlet being smaller than a length of the first inlet in the width direction;

a first guide portion provided in the housing to connect the first inlet with the outlet, the first guide portion having a bent portion;

a second guide portion defined in the housing to connect the second inlet with a confluence position of the first guide portion defined at a position in a vicinity of the bent portion;

a scanning unit arranged in the housing and at a position on the outlet side with respect to the confluence position, wherein the first guide portion has a first lower guide surface and a first upper guide surface, and the second guide portion has a second guide surface, the second guide surface extending from the second inlet to the confluence position, the first lower guide surface being connected to the second guide surface at the confluence position and extending from the confluence position toward the outlet in a direction where the second guide surface extends, the first upper guide surface facing the first lower guide surface; and a second driven roller arranged at a position opposite to the second guide surface in the second guide portion, the second driven roller being rotatable about a second driven axis and facing the second guide surface.

2. The image scanning apparatus according to claim 1, further comprising:

a driving roller arranged on the first lower guide surface side in the first guide portion, and inside a path, in the width direction, from the second inlet opening to the outlet, the driving roller being configured to rotate about a driving axis, the driving axis being arranged on the outlet side with respect to the confluence position; and a first driven roller arranged on the first upper guide surface side in the first guide portion, the first driven roller being rotatable about a first driven axis which is arranged on the outlet side with respect to the driving axis.

3. The image scanning apparatus according to claim 1, wherein a distance between the second driven roller and the confluence position is smaller than a distance between the second driven roller and the second inlet opening.

4. The image scanning apparatus according to claim 1, further comprising an urging mechanism configured to urge the second driven roller toward the second guide surface.

5. The image scanning apparatus according to claim 2, wherein the first driven roller has a shaft of which axis is the first driven axis, the shaft being fixed to the first guide portion.

6. The image scanning apparatus according to claim 4, wherein the urging mechanism comprises:

an arm formed with a supported part with which the urging mechanism is rotatably supported by the housing, and a roller supporting part configured to rotatably support the second driven roller at a position spaced from the supported part; and an urging member configured to urge the arm by applying torque to rotatably move the second driven roller toward the second guide surface about the supported part.

7. The image scanning apparatus according to claim 6, wherein the urging member includes a torsion coil spring arranged coaxial with the supported part and configured to urge the arm by applying torque to move the second driven roller toward the second guide surface.

8. The image scanning apparatus according to claim 6, wherein:

a distance between the roller supporting part and the confluence position is less than a distance between the supported part and the confluence position; and the arm has a facing surface which faces the second guide surface and is inclined such that a part of the facing surface closer to the confluence position is closer to the second guide surface.

9. The image scanning apparatus according to claim 8, wherein the second driven axis is arranged on a side opposite to the second guide surface with a virtual plane therebetween, the virtual plane being defined as an extension of the facing surface extended toward the confluence position.

10. The image scanning apparatus according to claim 4, wherein the second driven roller contacts the second guide surface as urged by the urging mechanism.

11. The image scanning apparatus according to claim 2, wherein an entire circumferential surface of the first driven roller is arranged on the outlet side with respect to the driving axis.

12. The image scanning apparatus according to claim 2, further comprising a plurality of ribs formed on the first upper guide surface and protruding toward the first lower guide surface, the plurality of ribs being arranged between the confluence position and the first driven roller, tip ends of the plurality of ribs being closer to the first lower guide surface than the first driven axis to the first lower guide surface.

13. An image scanning apparatus, comprising:

a housing having a first inlet, a second inlet and an outlet, a width of the first inlet being wider than a width of the second inlet, the first inlet, the second inlet and the outlet being apart from each other;

a first guide defined in the housing, connected to the first inlet and the outlet and having a first guide surface and a second guide surface opposing each other;

a second guide defined in the housing, connected to the second inlet and a confluence position and having a third guide surface and a fourth guide surface opposing each other, the confluence position being defined in the second guide surface, the third guide surface is defined on the second guide surface side of the second inlet side with respect to the confluence position;

a driven roller exposing from the third guide surface; and a scanning unit arranged between the confluence position and the outlet.

14. The image scanning apparatus according to claim 13, further comprising:

a driving roller rotatable about a driving shaft and exposing from the second guide surface of the outlet side with respect to the confluence position; and a first driven roller rotatable about a first driven shaft and exposing from the first guide surface between the outlet and the confluence position, the first driven shaft being arranged on the outlet side with respect to the driving shaft in a direction from the confluence position to the outlet.

15. The image scanning apparatus according to claim 14, wherein the first driven roller is apart from the driving roller.

16. The image scanning apparatus according to claim 13, wherein the fourth guide surface and the second surface of the outlet side with respect to a bent portion extend in a same direction.

17. The image scanning apparatus according to claim 13, further comprising an urging mechanism configured to urge the driven roller toward the second guide surface.

18. An image scanning apparatus, comprising:
a first housing having a first surface;
a second housing arranged below the first housing, the second housing having a second surface facing and spaced apart from the first surface, the second housing having a third surface and a fourth surface facing and spaced apart from the third surface, the fourth surface being arranged below the third surface, the third and fourth surfaces connected to the second surface at a confluence position, a length of the third surface in a width direction and a length of the third surface in the width direction being smaller than a length of the first surface in the width direction;
a driven roller supported rotatably by the second housing, an outer circumferential surface of the driven roller protruding from the third surface, the driven roller being movable with respect to the third surface, and an axis of the driven roller extending in the width direction; and
a scanning unit arranged at a specific position, the specific position being a position on a least one of the first surface and the second surface, the specific position being opposite to the driven roller with respect to the confluence position.

\* \* \* \* \*